(12) United States Patent
Newman et al.

(10) Patent No.: US 11,061,832 B2
(45) Date of Patent: *Jul. 13, 2021

(54) HACKING-RESISTANT COMPUTER DESIGN

(71) Applicant: PathGuard, LLC, New York, NY (US)

(72) Inventors: Frank N. Newman, New York, NY (US); Dan Newman, Berkeley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/833,355

(22) Filed: Mar. 27, 2020

(65) Prior Publication Data

US 2020/0301853 A1 Sep. 24, 2020

Related U.S. Application Data

(63) Continuation of application No. 16/148,944, filed on Oct. 1, 2018, now Pat. No. 10,606,768, which is a continuation of application No. 15/437,056, filed on Feb. 20, 2017, now Pat. No. 10,089,248, which is a continuation-in-part of application No. 14/841,469, filed on Aug. 31, 2015, now Pat. No. 9,578,054.

(51) Int. Cl.
*G06F 12/14* (2006.01)
*G06F 21/53* (2013.01)
*G06F 21/79* (2013.01)

(52) U.S. Cl.
CPC .......... *G06F 12/1433* (2013.01); *G06F 21/53* (2013.01); *G06F 21/79* (2013.01); *G06F 2212/1052* (2013.01)

(58) Field of Classification Search
CPC ...... G06F 12/1433; G06F 21/53; G06F 21/79; G06F 2212/1052
See application file for complete search history.

(56) References Cited

U.S. PATENT DOCUMENTS 4,991,079 A 2/1991 Dann
6,507,904 B1 * 1/2003 Ellison .................... G06F 21/53
711/152

(Continued)

FOREIGN PATENT DOCUMENTS

JP 2007304954 A 11/2007
JP 2011215879 A 10/2011

*Primary Examiner* — Meng Li
(74) *Attorney, Agent, or Firm* — Bakos & Kritzer

(57) ABSTRACT

A computer architecture is disclosed for implementing a hacking-resistant computing device. The computing device, which could be a mainframe computer, personal computer, smartphone, or any other computing device suitable for network communication, comprises a first partition and a second partition. The second partition can communicate over a public network such as the Internet, or over a private connection. In contrast, the first partition cannot connect to the Internet, and can directly communicate only with the second partition or with input/output devices directly connected to the first partition. Further, the first partition segments its memory addressing for program code and can be configured to hardware-protect that code from alteration. The second partition is hardware-limited from reading or writing to the memory addressing of the first partition. As a result, the critical data files and program code stored on the first partition are protected from malicious code affecting the second partition.

9 Claims, 10 Drawing Sheets

(56) References Cited

U.S. PATENT DOCUMENTS

| | | | |
|---|---|---|---|
| 6,725,317 B1 | 4/2004 | Bouchier et al. | |
| 7,657,941 B1 | 2/2010 | Zaitsev | |
| 8,082,585 B1* | 12/2011 | Givonetti | G06F 21/567 |
| | | | 713/188 |
| 8,381,297 B2 | 2/2013 | Touboul | |
| 8,639,871 B2* | 1/2014 | Borchers | G06F 3/0613 |
| | | | 711/103 |
| 2002/0083362 A1 | 6/2002 | Semo et al. | |
| 2002/0133680 A1 | 9/2002 | Rosenquist et al. | |
| 2003/0140069 A1 | 7/2003 | Bobak | |
| 2003/0140238 A1 | 7/2003 | Turkboylari | |
| 2004/0044906 A1 | 3/2004 | England et al. | |
| 2004/0170046 A1 | 9/2004 | Belnet et al. | |
| 2004/0177342 A1 | 9/2004 | Worley | |
| 2004/0243759 A1 | 12/2004 | Itoh et al. | |
| 2005/0259484 A1 | 11/2005 | Newell | |
| 2006/0015749 A1 | 1/2006 | Mittal | |
| 2006/0059345 A1 | 3/2006 | Fayad et al. | |
| 2008/0072051 A1 | 3/2008 | Kaabouch et al. | |
| 2008/0146265 A1 | 6/2008 | Valavi | |
| 2009/0320048 A1 | 12/2009 | Watt et al. | |
| 2009/0327643 A1 | 12/2009 | Goodman et al. | |
| 2010/0031325 A1 | 2/2010 | Maigne et al. | |
| 2010/0146304 A1 | 6/2010 | Miyatake et al. | |
| 2010/0268905 A1 | 10/2010 | Reipold et al. | |
| 2010/0306848 A1 | 12/2010 | Gellerich | |
| 2010/0325454 A1 | 12/2010 | Parthasarathy | |
| 2012/0151473 A1 | 6/2012 | Koch et al. | |
| 2012/0240230 A1* | 9/2012 | Lee | G06F 21/564 |
| | | | 726/24 |
| 2012/0271985 A1 | 10/2012 | Jeong et al. | |
| 2014/0090046 A1 | 3/2014 | Touboul | |
| 2014/0115283 A1 | 4/2014 | Radovic et al. | |
| 2014/0281243 A1 | 9/2014 | Shalf et al. | |
| 2014/0331307 A1* | 11/2014 | Ellis | G06F 21/50 |
| | | | 726/11 |
| 2015/0172321 A1 | 6/2015 | Kirti et al. | |
| 2015/0229471 A1 | 8/2015 | Nair et al. | |
| 2015/0256332 A1 | 9/2015 | Raj et al. | |
| 2016/0044136 A1* | 2/2016 | Schiff | H04L 67/10 |
| | | | 709/221 |
| 2016/0055102 A1 | 2/2016 | Cesare et al. | |
| 2016/0070656 A1 | 3/2016 | Babu et al. | |
| 2016/0099969 A1* | 4/2016 | Angus | H04L 63/0876 |
| | | | 713/158 |
| 2016/0154753 A1* | 6/2016 | Gittins | G06F 13/1663 |
| | | | 710/117 |
| 2016/0234222 A1* | 8/2016 | Rosberg | H04L 63/101 |
| 2016/0248588 A1* | 8/2016 | Langhammer | H04L 9/3242 |
| 2016/0285875 A1* | 9/2016 | Lenz | H04L 63/10 |
| 2016/0308677 A1 | 10/2016 | Thom et al. | |

* cited by examiner

HACKING-RESISTANT COMPUTER DESIGN

CROSS REFERENCE TO RELATED APPLICATION

This application is a continuation of U.S. patent application Ser. No. 16/148,944, filed Oct. 1, 2018, now U.S. Pat. No. 10,606,768, which is a continuation of U.S. patent application Ser. No. 15/437,056, filed Feb. 20, 2017, now U.S. Pat. No. 10,089,248, which is a continuation-in-part of U.S. patent application Ser. No. 14/841,469, filed Aug. 31, 2015, now U.S. Pat. No. 9,578,054, and the foregoing applications are incorporated by reference herein in their entirety.

TECHNICAL FIELD

A computer architecture is disclosed for implementing a hacking-resistant computing device.

BACKGROUND

A common method to infiltrate a computer is by placing malicious computer executable code (malware) into a computer through the Internet or other network connection. Such hacking has become a major threat, and major instances of hacking have been widely reported. The widely prevalent approaches to thwarting such hacking rely on software to identify and disable or remove the malware. However, hackers are becoming increasingly sophisticated, and the customary protections are not sufficient.

Therefore, there is a need in the art for a hacking-resistant computer system architecture utilizing a hardware approach. Such a hardware approach would be available to various computers for various applications. For example, a bank, company, government agency, or individual using a hardware approach as disclosed herein will be substantially more protected against hackers who might attempt to take control of their computers to steal or corrupt confidential data, personal information, or passwords stored on the computer. The hardware approach disclosed herein protects against hackers to an extent not possible with current solutions.

SUMMARY

A computer system architecture for implementing a hacking-resistant computing device is disclosed. The computer system architecture prevents malicious computer executable code received from the Internet from accessing or affecting critical data files by hardware limiting the direct access of the critical data files to the Internet. The computing device, which could be a mainframe computer, personal computer, smartphone, or any other computing device suitable for network communication, comprises a first partition and a second partition. The second partition can communicate over a network, such as the Internet. In contrast, the first partition can communicate either directly with the second partition or with input/output devices directly connected to the first partition. As a result, the first partition is hardware restricted from connecting to the Internet and any other device, such as a server, which is connected to the Internet. All access to the Internet by the first partition is limited to the hardware connection between the first partition and the second partition, which in turn can connect to the Internet.

Further, the first partition includes hardware circuitry utilizing an operating system to segment the memory addresses of the first partition into sections. The memory addressing for program code, comprising computer executable code and related highly critical data, is segmented and hardware-protected from alteration. This approach can also be effected by the use of separate memory units in the first partition. In order to protect the critical data files, the second partition is hardware-limited from reading from or writing to the memory addressing of the first partition. Data from the second partition is transferred to the first partition through a "pull" command executed by the operating system of the first partition. Further, the second partition cannot "push" data to the first partition or control the first partition to send a "pull" command. All data pulled by the first partition from the second partition, by hardware design, is stored in the memory section of the first partition that is specifically for data files read from the second partition. Further, the first partition, by hardware limitation, prevents data files read from the second partition from being executed. As a result, the critical programs and critical data files stored on the first partition are protected from malicious code from the Internet or from any other source affecting the second partition.

BRIEF DESCRIPTION OF THE DRAWINGS

The detailed description makes reference to the accompanying figures wherein.

Other objects, features, and characteristics, as well as methods of operation and functions of the related elements of the structure and the combination of parts, will become more apparent upon consideration of the following detailed description with reference to the accompanying drawings, all of which form part of this specification.

DETAILED DESCRIPTION

Detailed illustrative embodiments are disclosed herein. However, techniques, methods, processes, systems, and operating structures in accordance with the disclosed principles may be embodied in a wide variety of forms and modes, some of which may be quite different from those in the disclosed embodiments. Consequently, the specific structural and functional details disclosed herein are merely representative, yet in that regard, they are deemed to afford the best embodiments for purposes of disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, electronic or otherwise, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list. The following presents a detailed description with reference to the figures.

Figure 1:
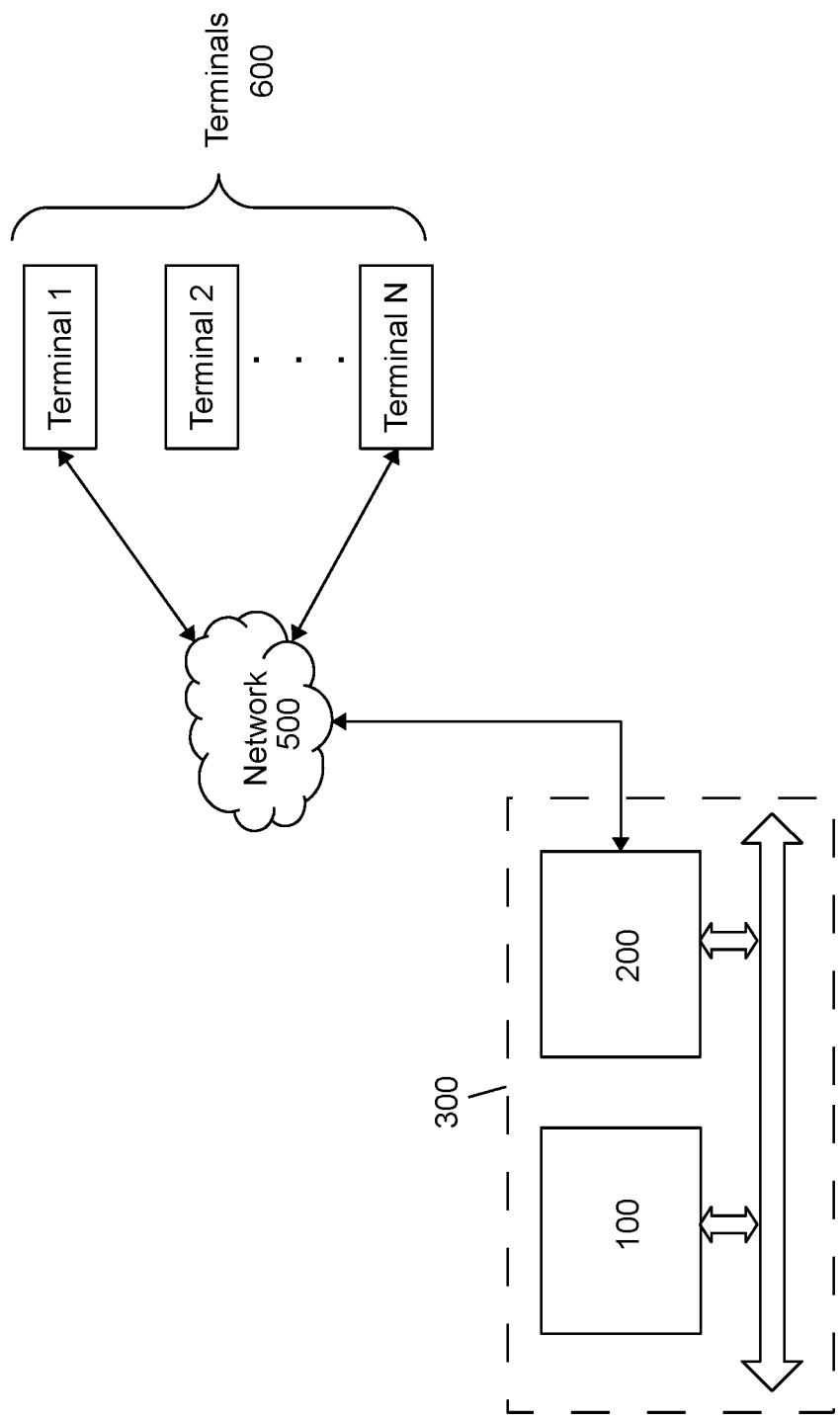
FIG. 1 illustrates an exemplary network diagram.

Referring initially to FIG. 1, shown is an exemplary network diagram of a hacking-resistant computing device. Computing device 300 can comprise any large-scale commercial or government computer or "mainframe," a set of linked computers operating in tandem, a single personal computer (PC) or mobile communication device including, but not limited to, a mobile telephone, cellular telephone, smart telephone, laptop computer, netbook, personal digital assistant (PDA), appliance, home or commercial building controller, or any other computing device suitable for network communication. Computing device 300 comprises first partition 100 and second partition 200. First partition 100 is directly interconnected to input/output devices, such as keyboards, data-storage drives, printers, and the like. In an embodiment for large-scale use, the first partition can be connected by direct hard wire to smaller computers or PCs, which are in a physical location under the control of the user of the computing device. In this embodiment, the user can disable the smaller computers or PCs from any form of Internet connection, including wire, cable, or Wi-Fi. Second partition 200 communicates over network 500 with terminals 600. As described in detail below with reference to FIG. 2A, first partition 100 can communicate directly with second partition 200 using a bus, but first partition 100 is hardware restricted from communicating with network 500. In the preferred embodiment, the CPU of the first partition can directly access the memory of the second partition and the CPU of the second partition, but the CPU of the second partition is hardware-restricted from accessing the memory of the first partition and the CPU of the first partition. For example, the CPU of the second partition is coupled to an interface of a bus. The interface is a physical port comprising physical wires for interconnecting the CPU of the first partition to the CPU and memory of the second partition. However, in some embodiments, the interface does not include physical wires for the CPU of the second partition to access the memory of the first partition or the CPU of the first partition.

Network 500 can be a local area network (LAN), a wide area network (WAN), the Internet, cellular networks, satellite networks, a combination thereof, or any other network that permits the transfer and/or reception of data to and/or from computing device 300. The data transmitted to or from computing device 300 to terminals 600 through network 500 can be transmitted and/or received utilizing standard telecommunications protocol or standard networking protocol. In the preferred embodiment, the system utilizes Transmission Control Protocol/Internet Protocol (TCP/IP) and network 500 is the Internet and/or an intranet. Other examples of protocols for transmitting and/or receiving data include but are not limited to Voice Over IP (VOIP) protocol, Short Message Service (SMS), Bluetooth wireless transmission, and Global System for Mobile Communications (GSM). Network 500 is capable of utilizing one or more protocols of computing device 300 and terminals 600. Furthermore, network 500 can translate to or from other protocols to one or more protocols of terminals 600. In some circumstances, second partition 200 is exposed to malicious computer executable code that is attempting to access or affect the critical data files stored on computing device 300. As described below with reference to FIGS. 2A and 3A, the preferred embodiment prevents such malware from accessing or affecting the critical data files and memory of first partition 100.

Figure 2A:
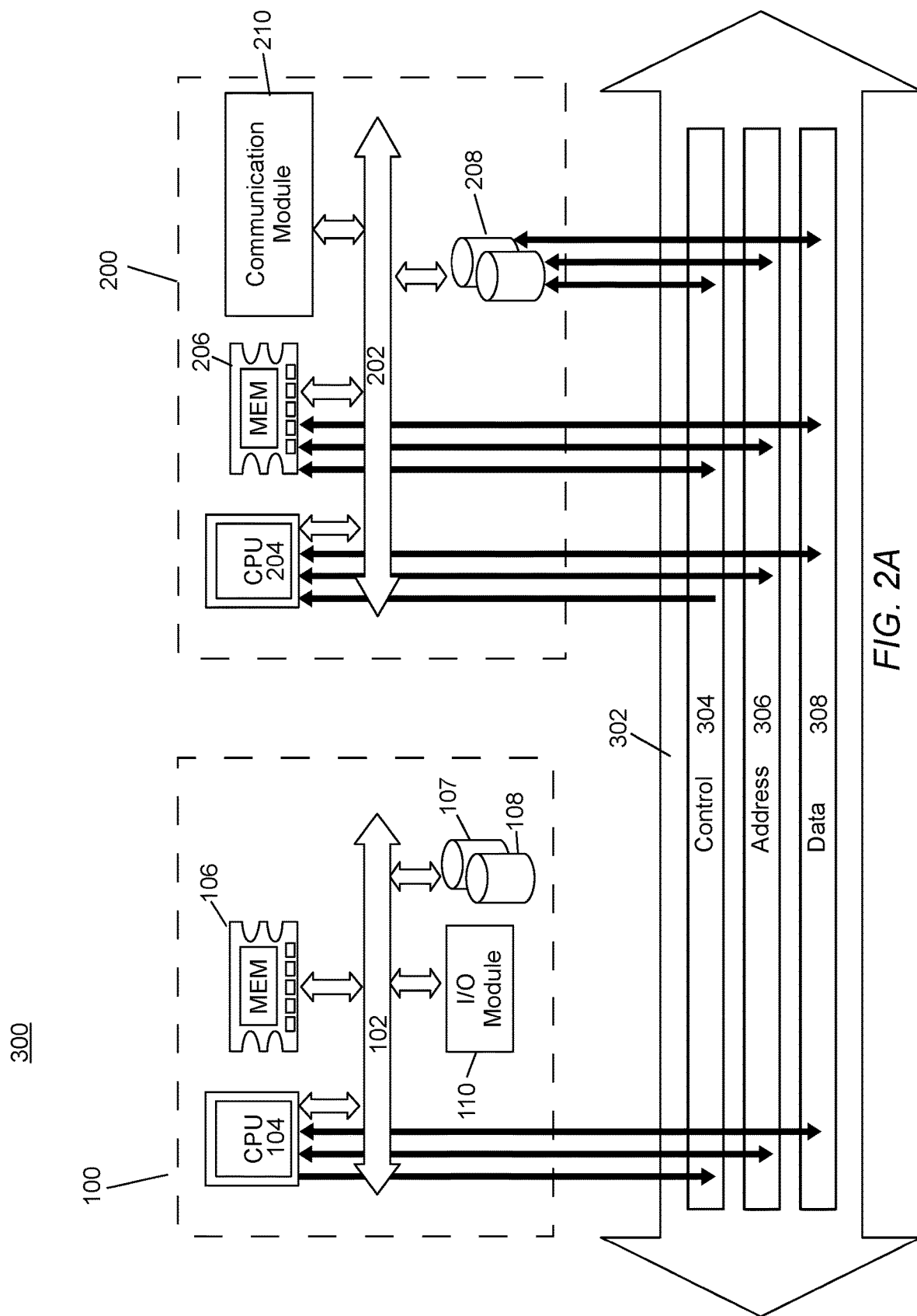
FIG. 2A is a block diagram depicting a computer system architecture for implementing the hacking-resistant computing device in accordance with various embodiments presented herein.

Referring now to FIG. 2A, shown is a block diagram depicting a computer system architecture for implementing a computing device 300 that is hardware-protected from infection with malicious computer executable code from the Internet and from any other source that can communicate through network 500. Computing device 300 comprises first partition 100. First partition 100 comprises a computer processing unit (CPU) 104 that is interconnected to first partition bus 102. First partition memory 106 is interconnected to CPU 104 through first partition bus 102. As described above with reference to FIG. 1, first partition 100 is interconnected to one or more input/output devices through input/output module 110. In the preferred embodiment, partition 100 further comprises data store 107 and 108. Critical data files are stored on memory 106 and/or data store 107. Data store 108 is used by the first partition for storing other data, including data that it has processed from second partition 200. First partition 100 includes an operating system for executing computer executable code. As described in detail below with reference to FIG. 3A, CPU 104 can execute only computer executable code stored on the program code address range of memory 106. This is accomplished through control by the operating system of CPU 104 (which itself is protected by this embodiment against malware) and by hardware circuitry. A fundamental weakness of current computer system architectures is that execution control is often turned over to malicious computer executable code that has reached the computer through the Internet. The present embodiment limits any execution of malicious computer executable code downloaded from the Internet to the second partition.

Computing device 300 further comprises second partition 200. Second partition 200 comprises a CPU 204 that is interconnected to second partition bus 202. At least one memory 206 is interconnected to CPU 204 through second partition bus 202. Communication module 210 allows second partition 200 to communicate through a network to terminals. The computer system architecture further includes at least one data store 208. Data store 208 is intended for the storage of data files that are not deemed critical. Second partition 200 includes an operating system for executing computer executable code. As described in detail below with reference to FIG. 3A, CPU 204 can execute computer executable code from the full address range of memory 206 and data store 208.

As shown in FIG. 2A, first partition 100 is directly interconnected to second partition 200 through bus 302. Bus 302 comprises a plurality of physical wires, including control lines 304, address lines 306, and data lines 308. Data lines 308 carry the information being transmitted between the partitions through bus 302. Address lines 306 comprise the address of the data and the address to send the data. Finally, control lines 304 manage the transfer of addresses and data, including but not limited to, the direction of the transfer. Exemplary control lines include, but are not limited to, read, write, clock, acknowledge, and reset. In such embodiments, the control lines from CPU 104 to bus 302 are unidirectional. Further, the control lines from CPU 204 to bus 302 are configured to only receive data, thereby permitting CPU 104 to control CPU 204, while CPU 204 cannot control CPU 104. As shown in FIG. 2A, memory 106 and data stores 107 and 108 are not directly connected to bus 302. Therefore, CPU 204 cannot control the memory of first partition 100. In contrast, memory 206 and data store 208 of the second partition are connected to bus 302. In the preferred embodiment, CPU 104 can write to the full address range of memory 206 and data store 208 of second partition 200 utilizing control lines 204, address lines 306, and data lines 308. One advantage of this design is the ability of first partition 100 to restore the operating system and data files of second partition 200 that have been affected by malicious computer executable code. In addition, CPU 104 can read data from the full address range of memory 206 and data store 208, but only by a "read" command (pull) by CPU 104. CPU 104 cannot, by hardware limitation, accept any data or other files pushed to it by second partition 200, because the control lines from CPU 104 to bus 302 are unidirectional. In addition, second partition 200 cannot pull any data from first partition 100, because CPU 204 is not attached to the control lines of CPU 104. Further, the operating system and supporting programs of first partition 100 define the formats and other file characteristics of data that CPU 104 will accept from second partition 200. Any attempt by second partition 200 to provide files to first partition 100 that are not in the proper expected form will be rejected by CPU 104. As described in detail below with reference to FIG. 3A, all data files read by CPU 104 from second partition 200 are written to the second partition address range of memory 106 and/or data store 108. First partition 100 is protected from any malicious computer executable stored on second partition 200, because CPU 104 can execute only computer executable code stored on the program code address range of memory 106.

Figure 2B:
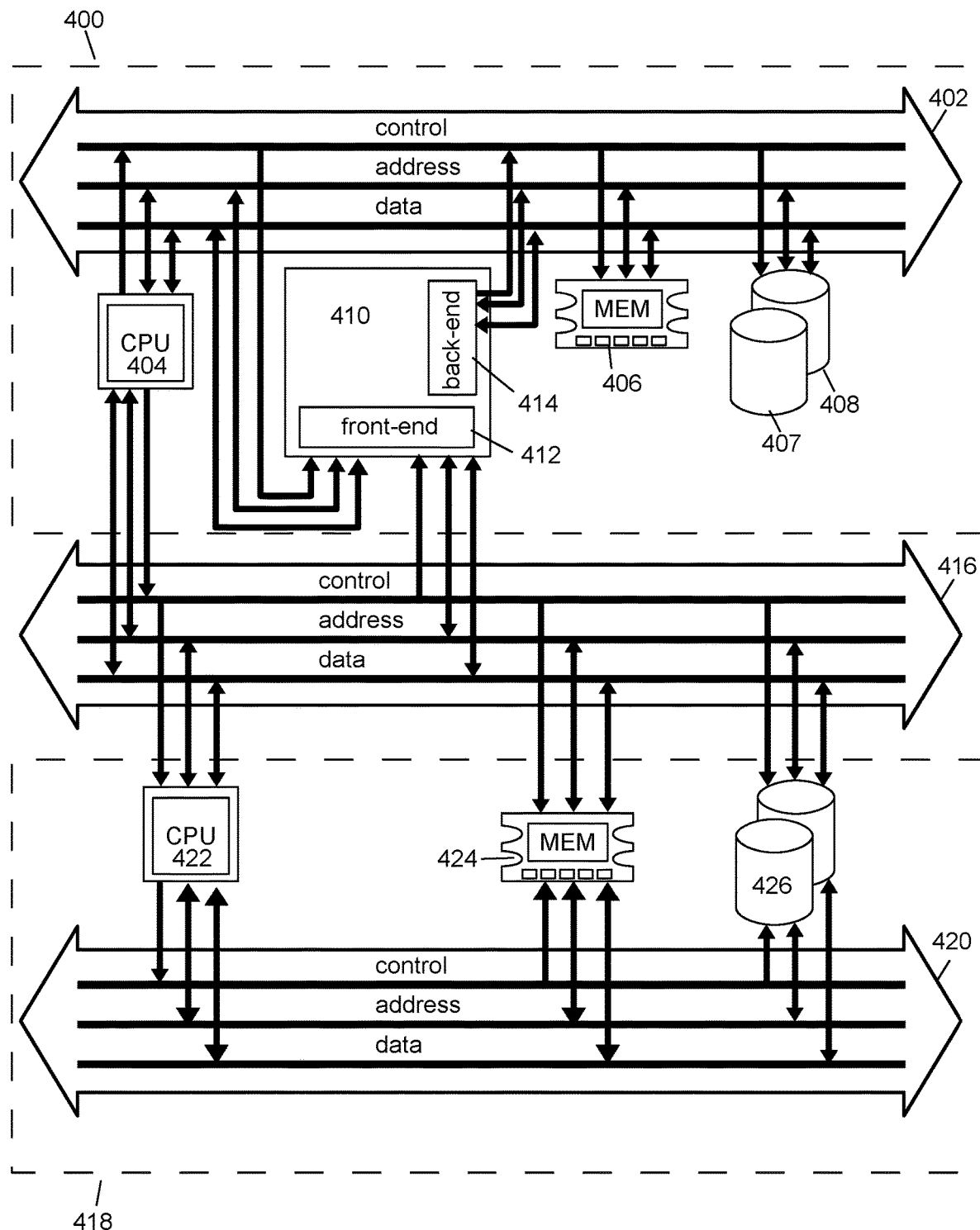
FIG. 2B is a block diagram depicting a computer system architecture for implementing the hacking-resistant computing device in accordance with various embodiments presented herein.

FIG. 2B depicts an exemplary block diagram of hardware restricting the access of a second partition to the memory and data store of a first partition utilizing a memory controller 410. As shown, the CPU 404 of the first partition 400 can directly control the CPU 422, memory 424, and data store 426 of the second partition 418 through bus 416. First partition 400 comprises memory controller 410. Memory controller 410 manages the flow of data to and from the memory 406 and data stores 407 and 408 of the first partition 400. In this embodiment, memory controller 410 comprises front-end 412 and back-end 414. Front-end 412 is coupled to first partition bus 402 and bus 416. Front-end 412 is hardware configured to ignore read and write control lines with an address originating from second partition 418. Front-end 412 comprises a comparator that compares the originating address to an address stored in read-only memory (ROM) or erasable programmable read-only memory (EEPROM). The ROM or EEPROM comprises the address of a device that is restricted from accessing the memory 406 and data stores 407 and 408 of the first partition 400. Front-end 412 passes the requests that are not restricted to back-end 414. In this embodiment, back-end 414 transmits the requests to memory 406 and data stores 407 and 408. While memory controller 410 is shown as a separate component, it may be integrated with the memory controller with CPU 104.

In yet another embodiment, the first partition hardware restricts a message communicated by the second partition utilizing a comparator. The first partition includes read-only memory (ROM) that comprises the address of the CPU of the second partition. Preferably the ROM is not reprogrammable. In this embodiment, the CPU of the second partition sends a message through a bus with a message frame comprising the destination address, address of the CPU, and the bytes of data to be sent as the message. An exemplary message is a push or pull request for information. The CPU of the first partition and the memory of the first partition include a comparator. The comparator compares the address of the sender of a message through a bus and the ROM. The comparator sends a control signal to disable the CPU and memory of the first partition from executing a message frame when the address of the sender matches the address in the ROM. Therefore, the CPU of the first partition is hardware restricted from accepting a push or pull command from the CPU of the second partition.

Figure 2C:
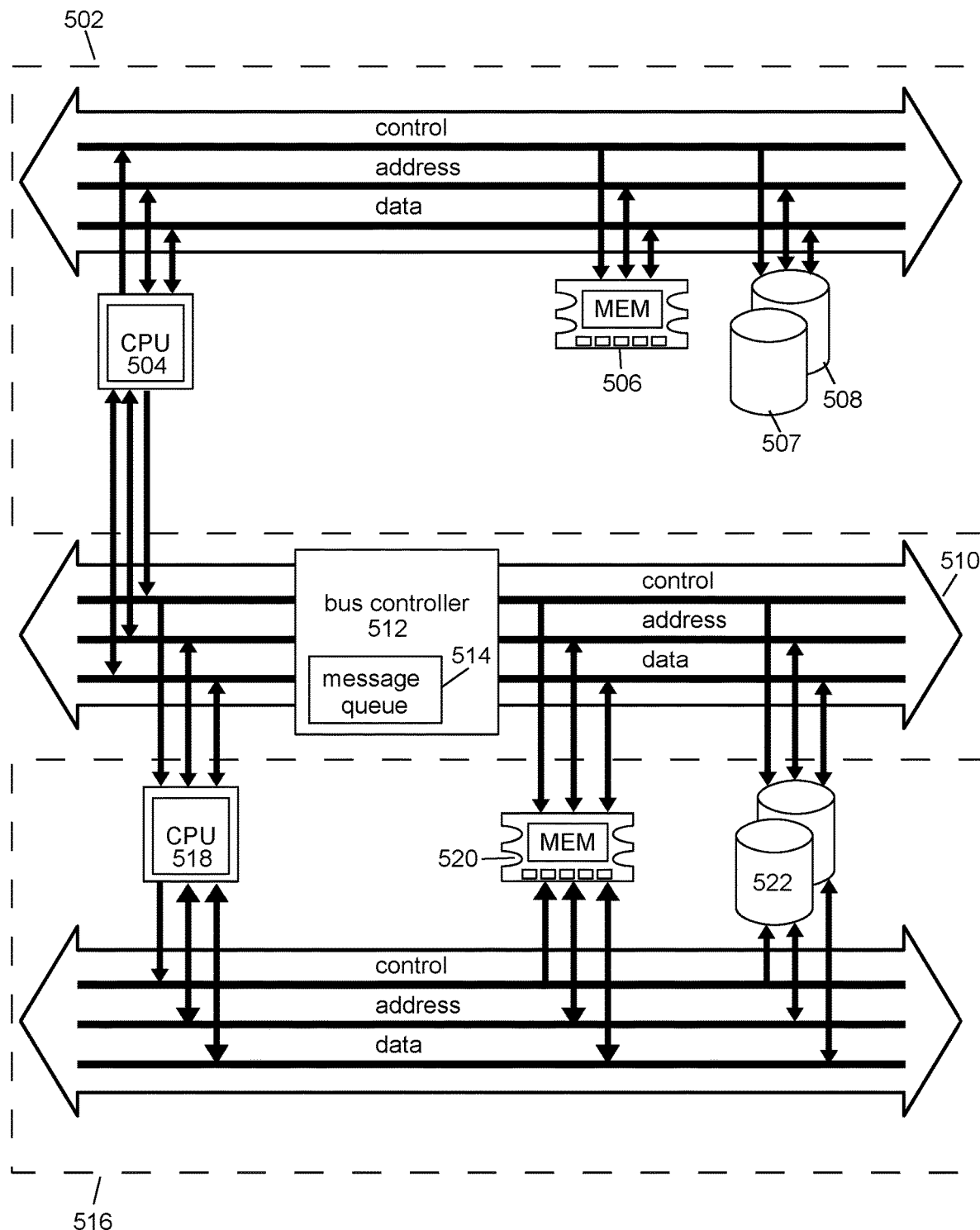
FIG. 2C is a block diagram depicting a computer system architecture in accordance with various embodiments presented herein.

FIG. 2C depicts an exemplary block diagram of hardware restricting the second partition from accessing the first partition utilizing a bus controller. Unlike the embodiments shown in FIG. 2A and FIG. 2B, which utilize a general bus to interconnect the first partition and the second partition, bus controller 512 manages the flow of request and data between components of the first partition coupled to bus 510 and the components of the second partition coupled to bus 510. As shown, CPU 504 of first partition 502 is coupled to bus 510, while CPU 518, memory 520 and data store 522 of the second partition are coupled to bus 510. Bus controller 512 comprises at least one message queue 514. Message queue 514 comprises a plurality of messages from first partition 502 to send to second partition 516. In this embodiment, bus controller 512 includes a look-up table stored in read-only memory with the identification address of the components that reside on first partition 502. Therefore, bus controller 512 can compare the address of a component sending a message through bus 510 utilizing a comparator to determine the origin of the message. Only messages that have been authenticated as originating from first partition 502 are stored in message queue 514. Bus controller 512 is configured to transmit the messages queued in message queue 514. As a result, the hardware circuitry of bus controller 512 restricts the components of second partition 516 from communicating or accessing the components of first partition 502 (e.g. CPU 504 and memory 506), because bus controller 512 prevents a component from second partition 516 from adding a message to message queue 514.

The computer system architecture described in FIG. 2A can be applied to various computing devices, including but not limited to large mainframe computers, personal computers, pads, tablets, and smart phones. Further, the computer system architecture can be applied to new products or adapted to existing computer designs. Although the computer architecture described in FIG. 2A is disclosed as a single set of chips, the techniques may be applied to a system with two separate computer systems, provided the computer systems are designed in accordance with the principles disclosed herein. In an embodiment with two separate computer systems, the first computer system (with a role similar to that of the first partition) would store the critical data files that are protected from malicious code, while the second computer system (with a role similar to that of the second partition) communicates with remote terminals. Further, the first computer system would be directly connected to the second computer system.

Figure 3A:
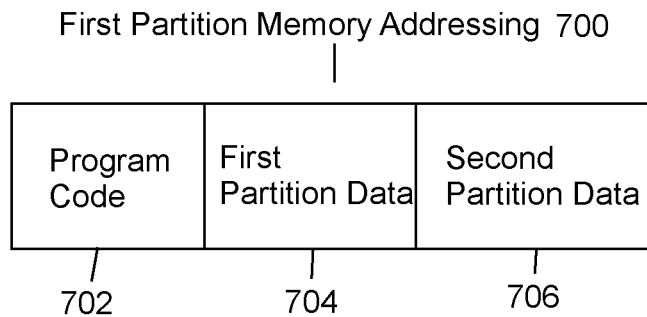
FIG. 3A depicts the memory addressing of the computing device in accordance with the preferred embodiment.
Figure 3A:
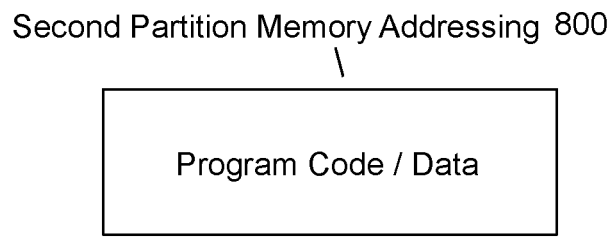

Turning next to FIG. 3A, shown is the memory addressing of the first partition and the second partition. First partition memory addressing 700 (in memory 106 shown in FIG. 2A) comprises at least one program code address block 702, at least one first partition data address block 704, and at least one second partition data address block 706. In the preferred embodiment, the writing and reading of data for each address block of first partition memory addressing 700 is restricted by designing the CPU of the first partition to physically limit the usable memory addressing space. For example, a CPU that supports 32-bit or 64-bit addressing can limit the access of the operating system for executing computer executable code to the bits mapped to the program code address. As a result, malicious computer executable code located on first partition data address block 704 and second partition data address block 706 is not executed by the operating system, even if some of such data files may be flagged as valid computer executable code. Further, the CPU of the first partition writes any data read from the second partition only to second partition data address block 706, which cannot be used for execution. This design prevents malicious computer executable code in the second partition from being written to program code address block 702 of first partition memory addressing 700. A further advantage of a hardwired design is that the address range of the write and read commands cannot be affected by malicious computer executable code, because the CPU of the first partition would need to be physically changed to affect the memory address ranges. It would be apparent to one skilled in the art that it would also be possible to utilize three separate memories for separating the addressing of the first partition.

Yet another degree of hardware protection can be implemented for the programs in program code address block 702. This can include highly critical data files that are infrequently updated, and associated with programs in program code address block 702. Access to update the contents of program code address block 702 is limited to devices that are directly connected to first partition 100. The combination of CPU 104, bus 102 and I/O module 110 can be controlled with optional hardware switches, so that the ability to modify the contents of program code address block 702 requires switching on by an authorized personnel. As a result, any update to program code address block 702 requires both access by authorized personnel at the directly-connected devices providing the updates and the independent action by personnel authorized to turn on the switches. For highly secure systems, this design would provide an added degree of protection against even authorized, directly-connected users from improperly attempting (inadvertently or intentionally) to modify the programs or highly critical data stored in program code address block 702.

In contrast, the CPU of the second partition is limited to reading and writing to second partition memory address 800. An exemplary hardware-restriction includes limiting the physical control wires of the CPU of the second partition to the physical memory components that comprise the second partition memory address 800. As shown in FIG. 3A, either data or program code can be read or written to the full address range of second partition memory address 800 utilizing known techniques in the art. However, the CPU of the second partition is hardware-restricted from accessing or modifying the memory address of the first partition. As discussed above, the CPU of the second partition can be hardware-restricted utilizing a memory controller. The memory controller includes the address of devices restricted from accessing or modifying the memory of the first partition stored in memory. For example, the device address of the CPU of the second partition could be stored. As a result, the memory controller can use a comparator or other techniques known in the art to disable the memory of the first partition from responding to a request from a restricted device address. This design prevents the CPU of the second partition from writing to the first partition malicious computer executable code that has affected the second partition from remote terminals through the Internet. Further, the CPU of the first partition can directly access second partition memory address 800, thereby improving the read and write performance of the CPU of the first partition by avoiding delays caused by activity on the bus interconnecting the first partition and second partition. The CPU of the first partition can read from memory address 800 only into second partition data address block 706, which is specifically devoted to data read from the second partition.

With respect to FIG. 3A, the address ranges can either be assigned to a portion of one or more memory units or comprise the entirety of a memory unit. Program code 702 comprises computer-executable code and related highly critical data. Access to program code 702 can be restricted utilizing a memory controller. The memory controller can compare the destination address and the requested operation (read, write, read, reset) with a mapping of restricted operations to a destination memory address. As a result, the memory controller can disable the memory unit or portion of memory unit that maps to the program code address when a restricted operation is requested. In an embodiment where the program code address is mapped to a single memory unit, the write control line of the memory unit can be disabled by connecting the line to ground or a switch.

Figure 3B:
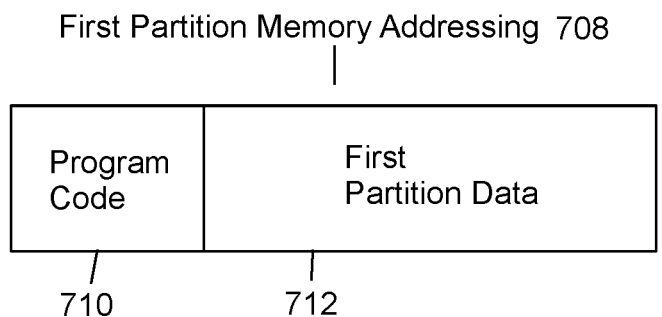
FIG. 3B depicts the memory addressing of the computing device in accordance with the preferred embodiment.
Figure 3B:
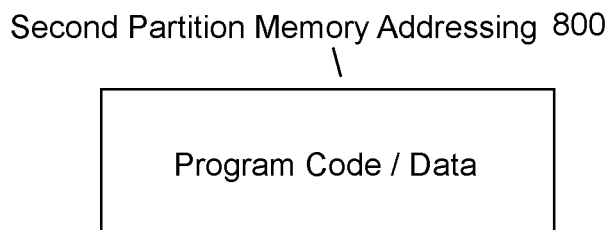

Whereas FIG. 3A depicts a first partition memory address comprising three address ranges, two or more address ranges may be used. FIG. 3B depicts a configuration in which first partition memory addressing 708 comprises two address blocks, program code address range 710 and first partition data address block 712. In this configuration, program code address block 710 is used to store code that may be executed by the CPU of the first partition. First partition data address block 712 is used to store other data that is not for execution by the CPU of the first partition. First partition data address block 712 is also used to store data that is read from the second partition onto the first partition.

Figure 4:
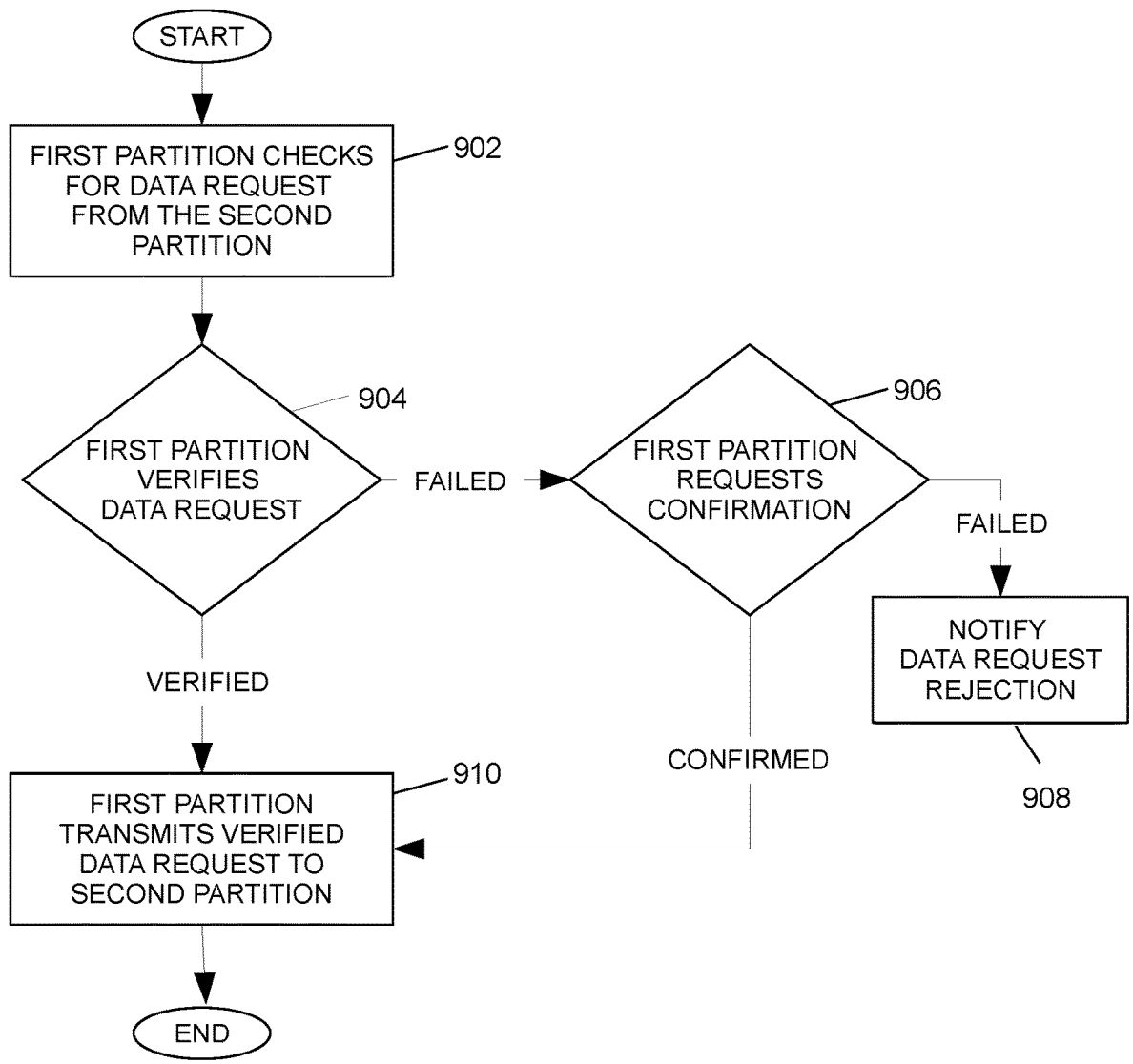
FIG. 4 is a flowchart depicting a process according to the preferred embodiment.

FIG. 4 depicts a flowchart representing the process of the second partition obtaining a data file located on the first partition. First in step 902, the CPU of the first partition periodically checks with the CPU of the second partition for a current data request. The data request can be a request to obtain items of data, update items of data, or request an action by the first partition, for example, transfer funds from one account to another, or changing the temperature setting in a building. Next, in step 904, a program resident on the first partition verifies the legitimacy of the data request. As described above, the program resident on the first partition is hardware-protected from infection by malicious computer executable code from the Internet and from any other network. The process proceeds to step 910 for a data request that is verified by the program resident on the first partition. Otherwise, the process proceeds to step 906 for a failed verification. In step 906, the CPU of the first partition can request confirmation by an authorized individual connected directly to the first partition due to any suspicious activity detected in step 904. The process proceeds to step 910 if an authorized individual connected directly to the first partition confirms the data request. Otherwise, the process proceeds to step 908. In step 908, the CPU of the first partition alerts the authorized individual that the data request has been rejected and proceeds to another data request. Following verification and/or confirmation, in step 910, the CPU of the first partition accesses the data file and provides applicable elements of data to the second partition. Under this design, the second partition cannot gain direct access to any critical data file on the first partition. As described above, the hardware of the computer system architecture disclosed in the preferred embodiment is structured so that the command to send data files from the first partition cannot be controlled by the second partition. As a result, any malicious code located on the second partition is unable to place the malicious code into the executable code of the first partition and thus access or affect any critical data files.

In addition to protecting the first partition, the present preferred embodiment can allow the first partition to restore the data files of the second partition that are affected by malicious computer executable code. Malicious computer executable code can disrupt the second partition and its control of screens and keyboards, thereby preventing users from accessing remote terminals through the second partition. In one embodiment, the first partition includes a hardware feature that utilizes a keystroke sequence to allow a user directly connected to the first partition to command the CPU of the first partition to take control of the screens and keyboards, as well as program control, of the second partition affected by malicious computer executable code. The authorized user directly connected to the first partition can, through the first partition, initiate protective software on the second partition. The user can also command the first partition to completely erase the memory and/or data files of the second partition to remove the malicious computer executable code, or restore the second partition to a previously saved state without such malicious code. In this embodiment, the operating system and the applications of the second partition are logged by the first partition. As a result, the first partition can restore the operating system and applications of the second partition after removing the malicious computer executable code. The second partition will be operational after the removal of the malicious code, thereby allowing access to remote terminals for the computing device.

In addition, the preferred embodiment makes it practical to introduce various types of protective software. As described above, the preferred embodiment utilizes various hardware methods to prevent malicious computer executable code from accessing and affecting the program code or data files of the first partition. Such methods include, but are not limited to, preventing the direct access of the first partition to remote terminals through the Internet and limiting the memory addressing of the first partition. Although this design limits the request for data files of the first partition from the second partition, other aspects of the computing device will operate as a normal computer system known in the art. For example, as the CPU of the first partition reads data from the second partition, the CPU of the first partition will often receive requests for individual items of data to be sent back to the second partition. This requested information can then be forwarded by the second partition to a remote terminal over a network. The preferred embodiment permits protective programs to be executed by the CPU of the first partition to check whether such data requests are suspicious, either individually or in aggregate over a period of time. An exemplary suspicious data request is a program on the second partition requesting critical data files mapped by the software on the first partition to financial information. As a result, the CPU of the first partition can initiate appropriate means of verification when suspicious activity is detected, including request for intervention from an authorized individual with direct connection to the first partition. In a further example, the hardware-protected program code of the first partition is programmed to send only specific items of data, rather than whole files or full sets of critical data files to the second partition. The exemplary program can also refuse to send confidential data, such as passwords and credit-card security codes to the second partition. Such programs are not practical in known systems, because malicious computer executable code can have direct access to critical data files and could alter protective programs.

The principles disclosed herein may also be incorporated into the architecture of mobile devices by creating a hardware "sandbox" for applications. Like the software "sandboxing" currently in use on some cell phone operating systems, this would allow applications access to some functions and data while restricting access to other critical memory. Unlike those existing methods, this embodiment offers a hardware limitation on the access of malicious computer executable code. Critical data and the operating system itself could be protected from alteration by any application, as all supplementary programs would be loaded into the second partition.

In addition, the principles disclosed herein can be used to protect networked devices whose primary interface is for a function other than computing. Appliances, such as refrigerators and thermostats, are increasingly designed to connect to the Internet. Such devices can also be designed with the computer system architecture of the preferred embodiment, to shield the functions of the primary partition from malicious computer executable code received over the Internet or through a network. Other "smart home" and "smart building" devices and computer-enabled consoles in vehicles may make corresponding use of the computer system architecture.

While the preferred embodiment is described in the context of an integrated new computer system architecture, the principles disclosed herein can be adapted to computing devices utilizing existing architectures in conjunction with a combination of hardware and software utilizing key features of the preferred embodiment. Such embodiments may be useful for users who have invested significantly in existing computers and want to continue using them, but want improved protection against hacking. In one embodiment, the first partition of the integrated system can be connected to an existing computer, which can hold most of the critical files and programs. As a result, the computer would be isolated from the Internet and other external sources, as described above for the first partition of the integrated system. The first partition could communicate, read and write with the computer, through a bus or I/O module, and the computer would be protected by hardware and an operating system from malware.

Figure 5:
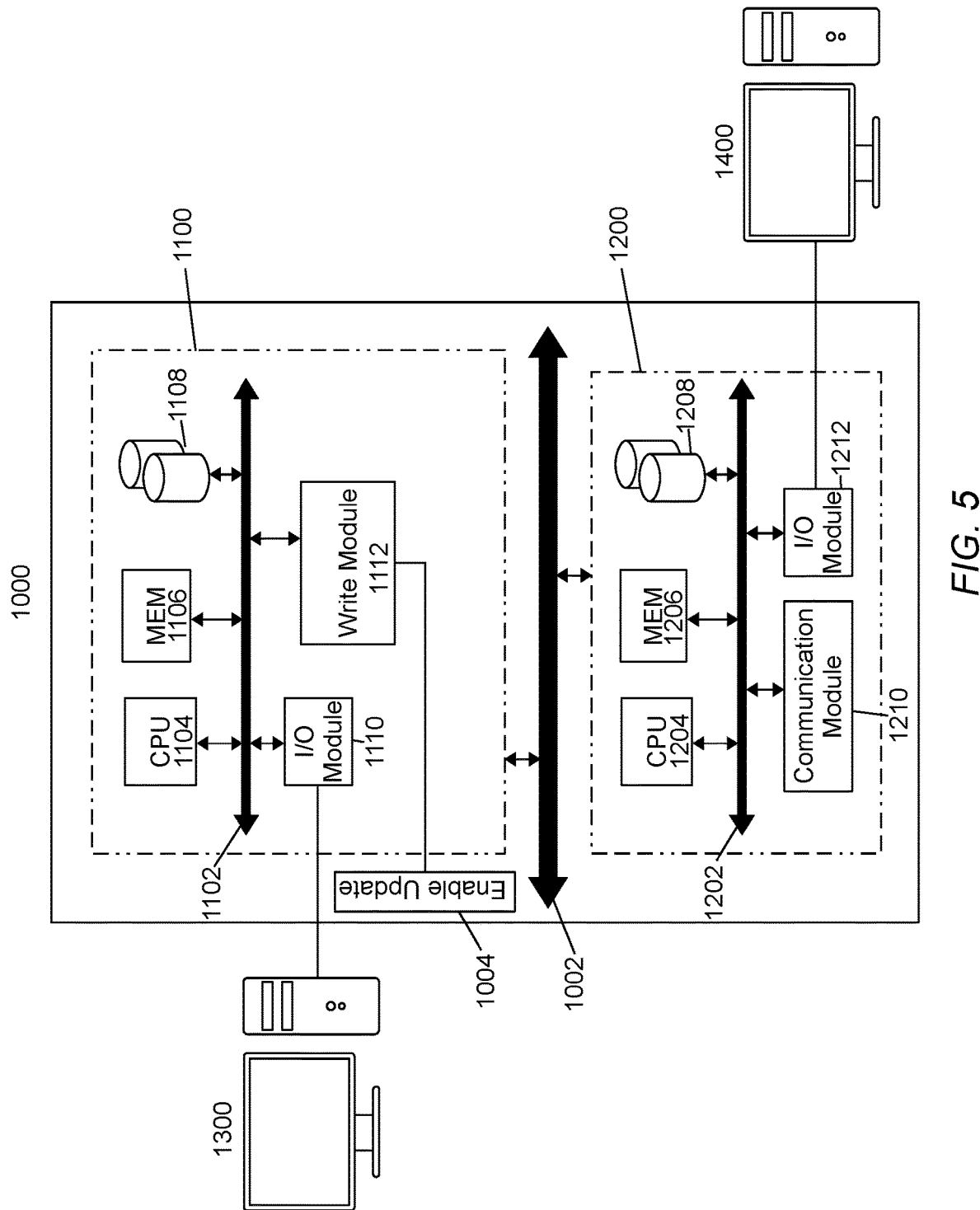
FIG. 5 is a block diagram depicting an embodiment adapted for use with computing devices utilizing existing computer architectures.

Another alternative embodiment is illustrated in FIG. 5, comprising first computer 1300 and second computer 1400. First computer 1300 and second computer 1400 utilize known computer architectures in the art, for example, x86, ARM, and PowerPC. As such, first computer 1300 and second computer 1400 contain operating systems for executing computer executable code. As discussed above, the disadvantage of these known architectures is that the processor of first computer 1300 and second computer 1400 are susceptible to the execution of malicious computer executable code received from the Internet, which can access and affect critical data files. Further, such malicious computer executable code can circumvent known software solutions. In the present embodiment, second computer 1400 can connect to the Internet. As a result, second computer 1400 is susceptible to malicious computer executable code from the Internet. However, first computer 1300 is not connected to the Internet and is interconnected to second computer 1400 through computing device 1000. First computer 1300 could achieve some degree of protection through use of an operating system approach, as described in detail below with reference to FIG. 6A. However, such protection would be limited and subject to compromise by sophisticated hackers. It will be far more protective to also employ computing device 1000, using hardware design and techniques of the present preferred embodiment, to protect first computer 1300 from any malicious computer executable code affecting second computer 1400. Computing device 1000 embodies much of the architecture of the full integrated system described above, allowing first computer 1300 to deal with data and requests received from the Internet by computer 1400, in ways that resist hacking attempts on computer 1300.

As shown in FIG. 5, computing device 1000 comprises first partition 1100 and second partition 1200. Second partition 1200 comprises CPU 1204, memory 1206, data store 1208, and I/O module 1212, which are interconnected by bus 1202. CPU 1204 executes an operating system located on data store 1208 and/or memory 1206 to communicate with second computer 1400 through I/O module 1212. I/O module 1212 can be a USB port, eSATA, WiFi, or any other known communication interfaces for connecting computing device 1000 to second computer 1400. In this embodiment, software is executing on second computer 1400, which allows CPU 1204 to receive data from second computer 1400. The data files read from second computer 1400 by CPU 1204 are stored on memory 1206 and/or data store 1208. CPU 1204 is hardware limited from directly communicating with first computer 1300. In one embodiment, bus 1002 can utilize the bus controller techniques described above with reference to FIG. 2C to restrict second computer 1400 from accessing the CPU and the memory of first computer 1300. Second partition 1200, further comprises communication module 1210. Communication module 1210 allows second partition 1200 to communicate through a network, such as the Internet. As a result, communication module 1210 can be utilized by first computer 1300 to access data from the Internet, instead of utilizing second computer 1400 to access data from the Internet.

Computer 1300 and computing device 1000 are directly interconnected to input/output devices, such as keyboards, data-storage drives, printers, and the like. In an embodiment for large-scale use, computer 1300 and computing device 1000 can be connected by direct hard wire to smaller computers or PCs, which are in a physical location under the control of the user of the computing device. In this embodiment, the user can disable the smaller computers or PCs from any form of Internet connection, including wire, cable, or Wi-Fi. Computing device 1000 is hardware restricted from communicating with remote terminals over a network. Computer 1300 is preferably restricted by other means from communicating with remote terminals over a network, for example, disabling remote connections in the operating system of computer 1300.

First computer 1300 is directly connected to I/O module 1110 of first partition 1100. I/O module 1110 can be a USB port, eSATA, or any known communication interfaces for connecting computing device 1000 to first computer 1300. First partition 1100 further comprises CPU 1104, memory 1106, and at least one data store 1108, which are interconnected by bus 1102. As described in detail above with reference to FIG. 3A, CPU 1104 can execute only computer executable code stored on the program code address range of memory 1106, and data store 1108. This is accomplished through control by the operating system of CPU 1104 (which itself is protected by the present embodiment against malware), by hardware circuitry.

In this embodiment, software is executing on first computer 1300, which allows CPU 1104 to send and receive data from first computer 1300. The software allows the user of first computer 1300 to segment the areas of memory for first computer 1300 into critical programs, critical data files, and data and requests received from computing device 1000. In addition, the software prevents the CPU of first computer 1300 from turning over execution control to the memory segment with files received from computing device 1000. One example of computer security for separating the memory segment from execution control is the use of a sandbox security mechanism. First partition 1100 is directly interconnected to second partition 1200 through bus 1002. CPU 1104 can write to the full address range of memory 1206 and data store 1208 of second partition 1200. In addition, CPU 1104 can read data from the full address range of memory 1206 and data store 1208, but only by a "read" command (pull) by CPU 1104. CPU 1104 cannot, by hardware limitation, accept any data or other files pushed to it by second partition 1200. In this embodiment, the software running on first computer 1300, which is directly connected to first partition 1100, can request CPU 1104 to pull any data from second partition 1200. First partition 1100 of computing device 1000 is protected from any malicious computer executable code stored on second computer 1400 or memory 1206, because CPU 1104 can execute only computer executable code stored on the program code address range of memory 1106 and data store 1108.

In this embodiment, first partition 1100 utilizes write module 1112 to write data to the segment of memory selected by the software running on first computer 1300 for data files received from computing device 1000. Write module 1112 comprises hardware circuitry to map the segment of memory of first computer 1300 segmented as data files received from computing device 1000. An exemplary hardware circuity includes Field Programmable Gate Arrays (FPGAs) that can be programmed by control of authorized staff connected directly to computing device 1000. In this embodiment, computing device 1000 comprises enable update switch 1004. Enable update switch 1004 includes an on position and off position. The on position of enable update switch 1004 allows programming of the hardware circuitry of write module 1112 to the segment of memory for data files received from computing device 1000. In addition, the on position of enable update switch 1004 prevents computing device 1000 from sending data to first computer 1300. In contrast, the off position of enable update switch 1004 allows computing device 1000 to send data to the software running on first computer 1300. The off position of enable update switch 1004 prevents unauthorized changes to the hardware circuitry of write module 1112. Computing device 1000 and computer 1300 can also utilize the extra protection switch and the protective software described above.

In some embodiments, in addition to the functions described above with reference to FIG. 5, the switch is used to initiate further safety features in order to protect the first partition from second partition data during an update. As the switch is activated, the connection between the two partitions can also be disabled, so that the first partition does not have access during the update process to data on the second partition, and the first partition would not be able to send data to or read data from the second partition. During normal operation in the normal operation state, the first partition can access the second partition, either through a direct connection implemented with hardware circuitry or through a bus, using a switch employing a logic gate(s) or transistor(s) set to permit commands to flow from the first to the second partition. But during update mode, that access is disabled by selecting the switch or bus (such as a tri-state gate or any kind of switchable bus), and moving it into the "off" position, thus providing additional protection for the first partition during the update process. An "AND" gate could be triggered by the switch position to permit communication (reading "TRUE") when its logical conditions are met. In addition, an external device connected directly to the first partition can be utilized to enable the CPU of the first partition to take control of any connected devices such as a monitor, keyboard, input device, printer, and other peripherals. This can be implemented through a form of "KVM" switch, and may be particularly useful when the two partitions are sharing use of peripheral devices; for example, if there is a malware problem in the second partition, the user could turn on the enabling device, to allow the first partition to take control of the monitor and keyboard away from the malware, so that actions might be taken independently on the first partition.

For many uses, the switch described above with reference to FIG. 5 will be critical for updating systems; the memory for program code utilizes digital circuitry such as logic gates to make that memory read-only, so that it is not possible to write to the program code memory, unless the switch is on. However, there may be some uses for which no updating is anticipated, but the memory address range for program code should be hardware-protected from alteration. An alternative embodiment could be employed, in which the switch could be omitted. The memory range for program code could be loaded in the process of manufacture, then permanently restricted from alteration, by means of hardware circuitry. This could be accomplished through various techniques known in the art, such as logic gates in the hardware circuitry. Thus, a basic embodiment would hardware-protect the memory address range for program code without reference to a switch, and the ability to add a switch could be a potential added feature.

In order to facilitate convenience and safety of updating an operating system and/or key applications for the first partition, a separate unit can be used. This unit can be physically separate; or it can be incorporated, with distinct and separate hardware circuitry, into the overall housing for the system, and connected to the first partition. The unit is capable of being connected to the Internet, through Ethernet cable, Wi-Fi, or similar means, for the specific purpose of downloading new critical applications or updating existing ones. The unit can have fixed hardware or firmware which allows it to connect through the Internet only to one or more predefined services for this purpose. Such preset addresses might, for example, include the official update addresses of key suppliers of computers and software. In contrast to an ordinary computer which permits Internet addresses to be typed in or set by software, this device cannot send connection requests for any Internet address other than those preset in its hardware or firmware. This restricts access by the device to only pre-approved addresses.

In normal operation, the first partition will not be enabled to accept any data in this fashion. At the time of update, the user would turn on the switch described above with reference to FIG. 5, connect the unit to the Internet, and the unit will connect directly and only to a predefined Internet address for this purpose, and download the applicable update.

If the unit is standalone, it can write the update data onto a nonvolatile memory such as a flash drive. The switch described with reference to FIG. 5 will enable the first partition to accept such update data through a USB drive or similar facility connected to the first partition. The flash drive or similar device can then be inserted into the USB drive, the update can be completed, and the user can remove the device and turn off the switch and proceed to normal operation.

If the unit is built into the overall system housing, then the switch described in FIG. 5 will enable its use, when the switch is turned on. The update can be completed, and the user can turn off the switch and proceed to normal operation.

The principles disclosed herein may also be used to enable secure updates from a remote location by protecting a security key, one installed in any computing device at the time of manufacture, or when such a device is prepared for shipment by a supplier. Most modern encryption systems use a mathematical algorithm that remain practically secure (the AES-256 standard is commonly seen as requiring millions of years of standard processing power to crack), but can still be broken in theory; cryptographic circles claim some entities can break up keys up to 2048 bits long. A security key of random digits offers the higher standard of a perfectly secure message between any two parties possessing the key. Parties wishing to communicate more than once could carry multiple versions of single-use keys, as spies did in World War II, and computing devices could keep many versions in memory. But without the hardware protection disclosed herein, any file of such keys would itself be vulnerable to tampering. By placing such a file into the protected memory of the first partition, remote parties can communicate securely and repeatedly.

Figure 6A:
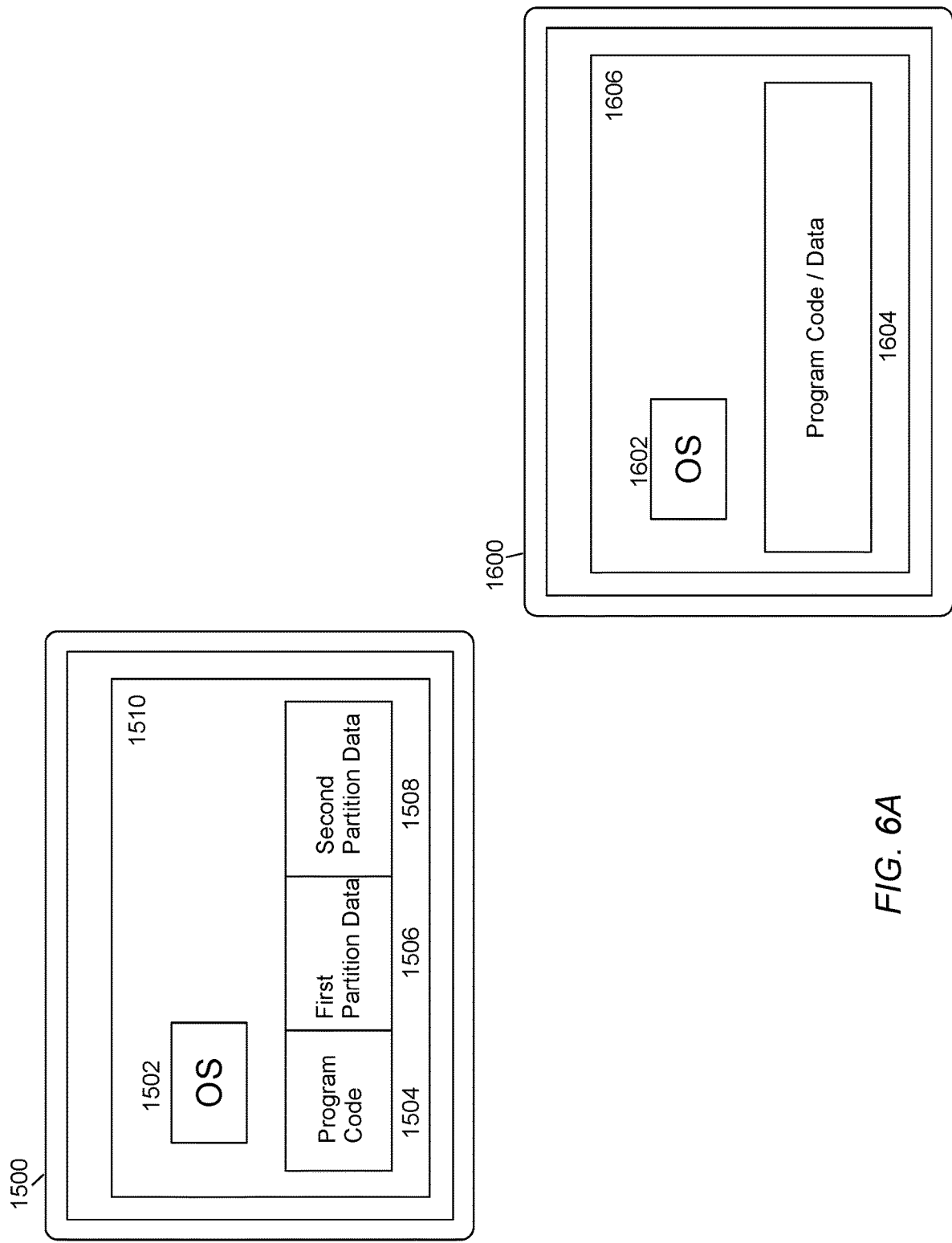
FIG. 6A is a block diagram depicting a software embodiment adapted for use with computing devices utilizing existing computer architectures.

FIG. 6A depicts an embodiment adapted to computing devices utilizing existing architectures with a software solution. While a software solution may be susceptible to malicious executable computer code, it can provide some of the benefits of the hardware solutions described above, including restricting access to critical data files, limiting program execution access to the first computer, and avoiding giving program control to any inputs from second computer. In this embodiment, first computer 1500 is connected to second computer 1600 utilizing known communication interfaces, for example, USB, eSATA, WiFi or Ethernet. First computer 1500 and second computer 1600 utilize known computer architectures in the art, for example, x86, ARM, and PowerPC. As such, first computer 1500 and second computer 1600 contain operating systems for executing computer executable code. The critical files and systems reside on first computer 1500, while second computer 1600 is used to connect to the Internet. This design provides for the software of first computer 1500 to interact with second computer 1600 in a method that reduces the risk of hacking first computer 1500. Malware that might be received from the Internet by second computer 1600 is blocked by software executing on first computer 1500 from reaching the point of executable code on first computer 1500.

First computer 1500 comprises virtual partition 1510 executing on first computer 1500. While virtual partition 1510 can utilize some of the computing resources (i.e. CPU and storage) of first computer 1500, virtual partition 1510 is isolated from accessing the operating system of first computer 1500, using known techniques in the art, for example software "sandboxing." As a result, virtual partition 1510 is limited from affecting the operating system of first computer 1500 in the event that virtual partition 1510 has been affected by malicious computer executable code received from virtual partition 1606 of second computer 1600. Further, virtual partition 1510 is limited to accessing data from input devices directly attached to first computer 1500 and virtual partition 1606 of second computer 1600. As a result, virtual partition 1510 is restricted from accessing computing resources of first computer 1500 that can connect to remote terminals over a network.

In this embodiment, the operating system of first computer 1500 allocates a portion of the memory of first computer 1500 to virtual partition 1510. Operating system 1502 of virtual partition 1510 is programmed to execute only program code located at program code address block 1504 of virtual partition 1500. All data received from virtual partition 1606 of second computer 1600 is stored at second partition data address block 1508. Finally, the critical data files of virtual partition 1510 are stored in first partition data address block 1506. In this design, the critical data files of first computer 1500 are protected from access by malware that may have been placed in second computer 1600. Virtual partition 1510 can request the operating system of first computer 1500 to access data files stored on first computer 1500, using the process described in detail above with reference to FIG. 4. The operating system of first computer 1500 can access the full address range of the memory allocated to virtual partition 1510. However, since any data read from second computer 1600 is stored in second partition data address block 1508 of first computer 1500, and the operating system of first computer 1500 is restricted from executing the data files stored on second partition data address block 1508, first computer 1500 will not execute any malicious executable code transferred from second computer 1600.

Second computer 1600 comprises virtual partition 1606 created by resident software executing on second computer 1600. In this embodiment, second computer 1600 is connected to remote terminals through a network. Virtual partition 1606 can utilize some of the computing resources (i.e. CPU and storage) of second computer 1600. The operating system of second computer 1600 allocates a portion of memory of second computer 1600 to virtual partition 1606. Further, the operating system of second computer 1600 allows virtual partition 1602 to access resources to communicate with remote terminals through a network. Virtual partition 1602 comprises operating system 1602, which can access and execute the full address range of program code/data address block 1604, which is allocated to virtual partition 1606 by the operating system of second computer 1600. Operating system 1502 of virtual partition 1510 is programmed to read data using a pull command from the full address range of program code/data address block 1604. However, operating system 1502 cannot, by software limitation, accept any data or other files pushed to it by virtual partition 1606 of second computer 1600. The software in second computer 1600 formats data to be read by first computer 1500 in the forms required by operating system 1502. Second computer 1600 could be infiltrated by Internet hackers. If malware alters the format of data to be provided for first computer 1500, then operating system 1502 will not accept the improperly formatted data. In addition, the software can utilize the process described above in detail with reference to FIG. 4, for the first computer to obtain data from the second computer.

Figure 6B:
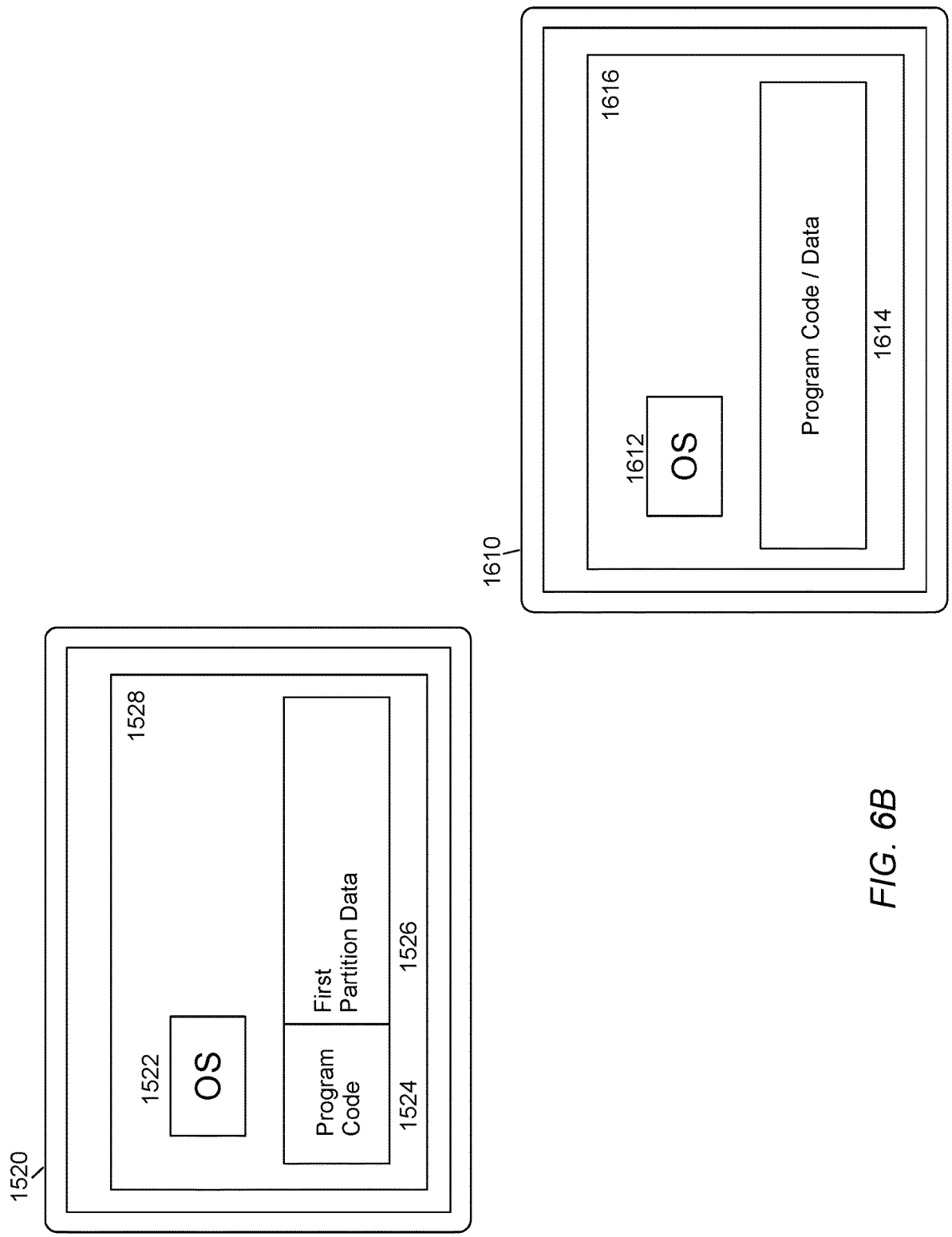
FIG. 6B is a block diagram depicting a software embodiment adapted for use with computing devices utilizing existing computer architectures.

Whereas FIG. 6A depicts a first computer comprising three address blocks, two or more address blocks may be used. FIG. 6B depicts a configuration in which first computer 1520 comprises two address blocks, program code address block 1524 and first partition data address block 1526. In this configuration, program code address block 1524 is used to store code that may be executed by operating system 1522. First partition data address block 1526 is used to store other data that is not for execution by operating system 1522. First partition data address block 1526 is also used to store data that is read from the second computer 1610 onto the first computer 1520.

Although the embodiments disclosed in FIGS. 6A and 6B utilize virtual partitions to protect the programs and data of the first computer from malicious computer executable code, the techniques disclosed (i.e., software limiting access to critical data files, limiting program execution access to the first computer, and avoiding giving program control to any inputs from second computer) may be applied directly to the operating systems of the first and second computers without the use of virtual partitions. In any case, such embodiments can reduce the risk of hacking, but cannot provide the increased protection afforded by the full integrated system in the preferred embodiment, which can utilize hardware as well as software protections.

The computer system architecture described above with reference to FIG. 2A can also utilize virtual environments on each of the first partition and the second partition. These partitions can be used for the purposes of partitioning various operating system and program activities. Unlike the software solution described above with reference to FIG. 6A, the virtual environments implemented on the first partition are hardware-protected from the second partition as described above with reference to FIG. 2A.

In another embodiment, computing devices utilizing existing architectures can utilize virtual partitions instead of two physically separate partitions without departing from spirit of the broad inventive disclosure. Such embodiments utilizing virtual partitions can provide some of the benefits of the hardware solutions described above, including impeding Internet hacking, restricting access to critical data files, limiting program execution access, and limiting program control.

Such an embodiment can utilize known computer architectures in the art with virtual machine capabilities, for example, x86, ARM, and PowerPC, and comprises a "hypervisor" (or modified "kernel" or "container" system) to manage key aspects of the virtual partitioning and processing within the virtual-partition system. There are two main virtual partitions, a first virtual partition and a second virtual partition, which correspond to the physically separate first and second partitions described in detail above. The virtual partitions are configured prior to normal operation by an administrator using a virtual partitioning configuration process, working with a hypervisor or equivalent. Each virtual partition is allocated accessibility to the hardware resources of the computer, including memory, network connectivity, input/output connectivity, CPU, and various other characteristics depending on the capabilities of the computer. Further, the hypervisor can reassign or dynamically modify virtual partitions.

The first virtual partition (FVP) comprises a CPU and at least one operating system for executing computer executable code, and may have sub-partitions of virtual partitions of the FVP. For ease of reference, the FVP and its sub-partitions are referred to as the FVP "family" of virtual partitions.

The at least one second major virtual partition (SVP) comprises a CPU and at least one operating system for executing computer executable code, and may have at least one sub-partition. For ease of reference, the SVP and its sub-partitions are referred to as the SVP "family" of virtual partitions.

Both the FVP family and the SVP family may have additional functionality common for computers, including memory and I/O modules. The critical files and systems reside in the FVP family while the SVP family can communicate over a network, such as the Internet. In contrast, the FVP family can communicate only directly with the SVP family, or with input/output devices directly connected to the FVP family. The virtual partitioning is configured so that the FVP family is not connected to the Internet or any other device, such as a server, which is connected to the Internet. In order to protect the critical data files, the entire SVP family is configured to be prohibited from reading from or writing to any memory of the FVP family.

This design provides for the FVP family to interact with the SVP family in a way that reduces the risk of Internet hacking of the FVP family. Malware that might be received from the Internet by any part of the SVP family is impeded from being executed on the FVP family. Further, the critical files of the FVP family are impeded from being altered by or read by malware which may reside on the SVP family or become written to the SVP family.

The FVP family is configured so that its memory addresses are segmented into at least two sections, comprising one for computer executable code and highly critical data. Other configurations may comprise at least three memory ranges or partitions: one for computer executable code and highly critical data, one for data read from the SVP family, and at least one for other FVP family data.

Figure 7:
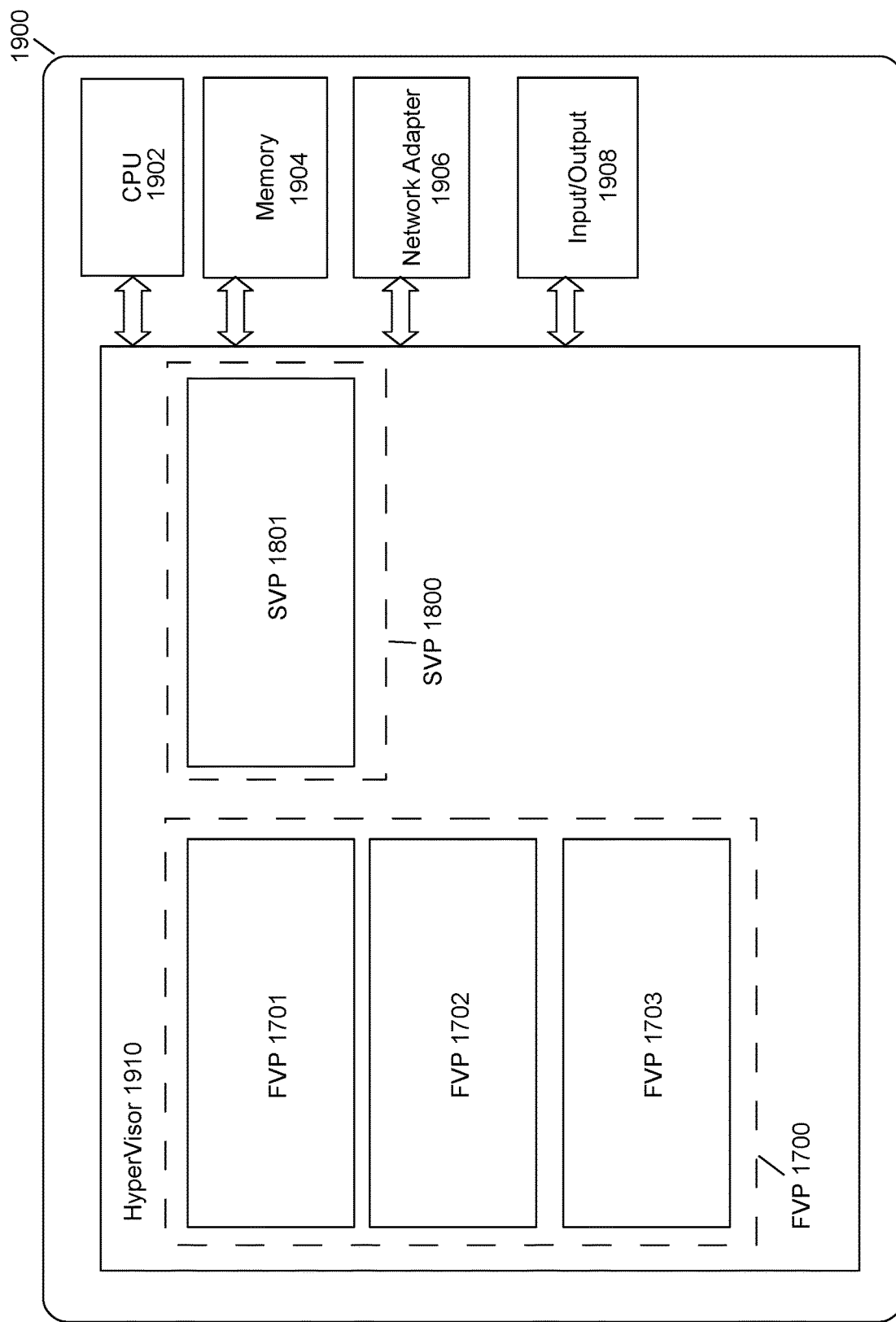
FIG. 7 is a block diagram illustrating an embodiment implementing virtual partitions on a computing device.

FIG. 7 is a simplified block diagram illustrating an exemplary embodiment implementing virtual partitions on a computing device. Computing device 1900 comprises CPU 1902, memory 1904, network adapter 1906, and input/output 1908 and utilizes an existing computer architecture. Further, computing device 1900 has the capability to create virtual partitions either with operating-system level virtualization or hardware virtualization utilizing Intel VT-x or AMD-V. Hypervisor 1910 is utilized to create, configure, and manage a plurality of virtual partitions. As shown, hypervisor 1910 manages the communication of the virtual partitions with CPU 1902, memory 1904, network adapter 1906, and input/output 1908. Hypervisor 1910 can be an application running within a host operating system. In this embodiment, hypervisor 1910 runs directly on computing device 1900 (a "Type-1" hypervisor). Hypervisor 1910 may be one of the commercially available virtualization solutions. Operating-system level virtualization can be used to isolate virtual partitions and manage the resources of the computing device without departing from the principles disclosed herein.

As shown in FIG. 7, hypervisor 1910 has created and configured FVP 1700, which comprises a family of sub-partitions, and hypervisor 1910 has configured SVP 1800, which also comprises a family of sub-partitions. Further, hypervisor 1910 manages the communications between FVP 1700 and SVP 1800. In this embodiment, hypervisor 1910 has allocated SVP 1800 access to network adapter 1906 and restricted FVP 1700 from accessing network adapter 1906. As a result, FVP 1700 is protected from infection with malicious computer executable code from the Internet and any other source that can communicate through network adapter 1906. FVP 1700 family comprises FVP 1701, FVP 1702, and FVP 1703. FVP 1701 comprises executable code and highly critical data, FVP 1702 comprises data read from the SVP 1800 family, and FVP 1703 comprises other FVP data. The operating system of FVP 1700 is configured to execute only program code located at a program code address in FVP 1701. SVP 1801 comprises data utilized by SVP 1800. All data read by FVP 1700 from SVP 1801 is stored in sub-partition FVP 1702. In this embodiment, hypervisor 1910 has restricted the access of SVP 1801 to CPU 1902 of computing device 1900.

Key data files of FVP 1700 can be stored in FVP 1701. Hypervisor 1910 has configured FVP 1700 to access the full address range of memory 1904 allocated to FVP 1700 and SVP 1800. Further, hypervisor 1910 is configured to send request for data by FVP 1700 from SVP 1800 to memory allocated to FVP 1702. FVP 1700 is protected from executing any malicious executable code transferred from SVP 1800, because the operating system of FVP 1700 is restricted to executing program code located at a program code address in FVP 1701.

In this embodiment, hypervisor 1910 has configured the virtual partitions so that the CPU resources allocated to FVP 1700 can only read from or write to any memory or CPU allocated to the FVP 1700 family. Software in the SVP 1800 family formats the data to be read by the FVP 1700 family in specific forms and lengths depending on the data. As discussed above, hypervisor 1910 has allocated SVP 1800 with access to network adapted 1906. Therefore, SVP 1800 could be infiltrated by Internet hackers. Hypervisor 1910 comprises a list of accepted data formats by FVP 1700. Prior to transferring data requested by FVP 1700 from SVP 1800, hypervisor 1910 checks the data with the list of accepted data formats. If malware affecting SVP 1800 has altered the format or length of the data to be provided for FVP 1700, then hypervisor 1910 can refuse to transfer the improperly formatted data to FVP 1700. In another embodiment, FVP 1700 can check the format of the data and refuse to accept the improperly formatted data.

To improve security, the hypervisor can configure the virtual partitions to isolate the FVP and its family of sub-partitions from other virtual partitions. Therefore, virtual partitions outside of the FVP family are restricted from accessing the CPU, memory, and any file allocated to the FVP family. Further, the hypervisor can restrict access when initially creating and configuring the FVP family, or at any time, including during the process of dynamically allocating resources and the size of the virtual partitions. Since many systems use dynamic adjustment to virtual partitions, and since the partitioning configuration can create shared areas of memory, care must be taken that the fundamental separation between the FVP family and any other partition outside the FVP family is not violated by dynamic adjustment to virtual partitions.

During normal operation, the hypervisor configures the memory allocated for executable code on FVP 1701 as read-only. For an update mode, in which critical programs are installed or updated on FVP 1701, the hypervisor can temporarily suspend the operation of the FVP family. There-after, the hypervisor reconfigures FVP 1701 to permit writing in order to install or update critical programs on FVP 1701. After completion of updating the critical programs, the hypervisor reconfigures FVP 1701 as read-only and allows FVP 1700 to resume normal operation. Alternatively, to enable the update mode, a hardware modification could be introduced into the system, in the form of a switch which would control whether FVP 1701 can be written to. This switch could also turn on or off the ability of the FVP family to access the SVP family. In addition, that switch or a separate switch could restrict the ability of the virtual configuration to be altered with respect to the FVP family. Such a switch, similar to the switch described above with reference to FIG. 5, could utilize logic gates, firmware, field programmable gate arrays, or other similar existing technology.

Any virtual server configured into the SVP partitions can be further protected with a hardware embodiment in accordance with the principles disclosed herein as a gatekeeper for input and output. A separate unit connects to the virtual servers between the router and the server bank. One such unit may be placed in any set of servers used in the virtual partitions, even if separated by a significant geographical distance.

All traffic flows through the unit, just as all information to or from other computers or units, such as over the Internet, must flow through the router. During initial setup of the virtual partitions, the unit is also configured to direct traffic to the FVP and SVP. Information could not be written from a remote computer to the FVP, for instance, because the unit would not allow it; all incoming data and code can go only to the SVP partitions.

Similarly, when the SVP wants to share information with the FVP, it cannot initiate a transfer, nor would any such request be permitted by the unit. Data from the SVP can go only to SVP 1801, which can be accessed at the initiation of FVP 1700. Data in FVP 1703 cannot be pushed to the SVP 1800.

The unit thus applies an embodiment and its additional security of hardware protections to perform functions of a Type-1 hypervisor, one whose supervisory functions precede the installation of an operating system. Its architecture permits direct access for some paths (from a network to the SVP 1800), while allowing read-only connections for other paths (from FVP 1702 to the SVP 1800), and no access at all for others (from FVP 1703 to the SVP 1800). The device is configured at the time of setup of the virtual partitions to know which address ranges correspond to which partitions. The unit can be protected from unauthorized reconfiguration by use of a read/write switch, similar to the switch described above with reference to FIG. 5. Such a switch can be manual or electric, as with a transistor. By limiting the use of the switch to local activation, the configuration of the unit cannot be altered from a remote location.

The system could also be configured with two or more first partitions, combined with one second partition, or two or more second partitions combined with one first partition, or two or more first partitions combined with two or more second partitions. Each of the first partitions would have the fundamental characteristics of the embodiments of the single first partition, including the memory structure, including protected executable code and highly critical data, with each first partition hardware-restricted from access by any of the second partitions, using hardware circuitry such as logic gates. This would permit, for example, multiple clients to be run on a single system, with each client's critical files kept on a separate protected first partition. It would also permit the system to communicate through more than one second partition, which might be especially helpful if one second partition becomes affected by malware.

While the principles disclosed herein have been described primarily with reference to the preferred embodiments, which have been set forth in considerable detail for the purposes of making a complete disclosure of the invention, the embodiments discussed are merely exemplary and are not intended to be limiting or represent an exhaustive enumeration of all aspects of the principles disclosed herein. Further, it will be apparent to those of skill in the art that numerous changes may be made in such details without departing from the spirit and the principles disclosed herein. It should be appreciated that these principles are capable of being embodied in other forms without departing from their essential characteristics.

What is claimed:

1. An apparatus, designed to connect computers, comprising:
    a bus controller configured to be coupled to a first computer and at least one second computer;
    wherein the bus controller is configured to receive a pull command from the first computer and to execute the pull command to read data sent from the at least one second computer through a bus and send the data read from the at least one second computer to at least one memory module of the first computer in a memory address range configured for data read from the at least one second computer;
    wherein the bus controller is configured to receive a push command from the first computer and to execute the push command to send data to the at least one second computer through the bus;
    wherein the bus controller will not permit a push command from the at least one second computer to the first computer;
    wherein the bus controller will not permit a pull command from the at least one second computer to the first computer; and
    wherein the hardware circuitry of the bus controller does not permit the at least one second computer to directly access the at least one memory module of the first computer.

2. An apparatus, designed to connect computers, comprising:
    a bus controller configured to be coupled to a first computer and a plurality of second computers;
    wherein the bus controller is configured to receive a pull command from the first computer and to execute the pull command to read data sent from one of the plurality of second computers through a bus and send the data read from the one of the plurality of second computers to at least one memory module of the first computer in a memory address range configured for data read from the plurality of second computers;
    wherein the bus controller is configured to receive a push command from the first computer and to execute the push command to send data to the one of the plurality of second computers through the bus;
    wherein the bus controller will not permit a push command from any of the plurality of second computers to the first computer;
    wherein the bus controller will not permit a pull command from any of the plurality of second computers to the first computer; and wherein the hardware circuitry of the bus controller does not permit any of the plurality of second computers to directly access the at least one memory module of the first computer.

3. A computer system comprising:
a first partition and a second partition communicatively coupled through a bus;
the first partition comprising:
  a first CPU, and
  a first memory module, comprising:
    a first memory unit comprising at least one memory address range for program code, wherein the program code comprises a computer-executable protective program;
    a second memory unit comprising at least one memory address range for other data, comprising data from the second partition; and
    wherein the first CPU is configured to execute only the computer-executable code in the at least one memory address range for program code;
the second partition comprising:
  a second CPU,
  a second memory module, and
  at least one communication module configured to couple to a network;
wherein the first partition is configured to store data read through the bus from the second memory module only into the at least one memory address range for other data;
wherein the first partition can send data through the bus to the second memory module; and
wherein the second CPU is restricted from directly accessing the first memory module.

4. The computer system of claim 3, wherein the computer-executable protective program is configured to verify the legitimacy of a data request from the second partition.

5. The computer system of claim 3, wherein the first CPU is configured to detect suspicious activity.

6. The computer system of claim 5, wherein the first CPU is configured to, if suspicious activity is detected, request authorization from an individual connected directly to the first partition.

7. The computer system of claim 3, wherein the program code is configured so that the first CPU does not write whole files to the second memory module.

8. The computer system of claim 3, wherein the program code is configured so that the first CPU does not write full sets of critical data files to the second memory module.

9. The computer system of claim 3, wherein the program code is configured so that the first CPU does not write confidential data to the second memory module.

* * * * *